(12) United States Patent
Li et al.

(10) Patent No.: US 11,409,322 B2
(45) Date of Patent: Aug. 9, 2022

(54) METHOD, APPARATUS AND MEDIUM FOR TIMING CONTROL IN AN ELECTRONIC DEVICE

(71) Applicants: Beijing JingDong ShangKe Information Technology Co., Ltd., Beijing (CN); Beijing Jingdong Century Trading Co., Ltd., Beijing (CN)

(72) Inventors: Changchun Li, Beijing (CN); Liu Liu, Beijing (CN); Genxiong Luo, Beijing (CN); Qiang Ren, Beijing (CN); Jian Gou, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 75 days.

(21) Appl. No.: 16/958,598

(22) PCT Filed: Sep. 30, 2018

(86) PCT No.: PCT/CN2018/109023
§ 371 (c)(1),
(2) Date: Jun. 26, 2020

(87) PCT Pub. No.: WO2019/128365
PCT Pub. Date: Apr. 7, 2019

(65) Prior Publication Data
US 2020/0333769 A1 Oct. 22, 2020

(30) Foreign Application Priority Data
Dec. 28, 2017 (CN) .......................... 201711471263.0

(51) Int. Cl.
*G05B 99/00* (2006.01)
*G06F 1/04* (2006.01)
*G05B 15/02* (2006.01)

(52) U.S. Cl.
CPC ............... *G06F 1/04* (2013.01); *G05B 15/02* (2013.01)

(58) Field of Classification Search
CPC ............................................. G05B 2219/2642
(Continued)

(56) References Cited

U.S. PATENT DOCUMENTS

2016/0224043 A1* 8/2016 Liu .................. G05B 15/02
2016/0292955 A1* 10/2016 Gronkowski ........... G07F 9/023
(Continued)

FOREIGN PATENT DOCUMENTS

CN 202261565 5/2012
CN 103699205 4/2014
(Continued)

OTHER PUBLICATIONS

International Search Report, issued in the corresponding PCT application No. PCT/CN2018/109023, dated Jan. 3, 2019, 6 pages.
(Continued)

*Primary Examiner* — Suresh Suryawanshi
(74) *Attorney, Agent, or Firm* — Hamre, Schumann, Mueller & Larson, P.C.

(57) ABSTRACT

The present disclosure provides a method for timing control of an electronic device, comprising: receiving a timing control instruction for the electronic device from a user, the timing control instruction comprises controlling the electronic device to operate repeatedly during N continuous time periods with the same certain time duration, wherein N is a positive integer greater than or equal to 2, and each time period at least comprises a first sub-time period and a second
(Continued)

sub-time period. Controlling an operation of the electronic device during each time period comprises: controlling the electronic device to perform a first action at a first time point which is a beginning of the time period; controlling the electronic device to perform a second action different from the first action, in response to the first sub-time period having elapsed since the first time point, and controlling the electronic device according to the timing control instruction.

12 Claims, 6 Drawing Sheets

(58) Field of Classification Search
USPC .......................................................... 700/275
See application file for complete search history.

(56) References Cited

U.S. PATENT DOCUMENTS

2017/0213578 A1*  7/2017  Chan ................... G11B 27/3081
2018/0213480 A1*  7/2018  Jung ................... H04W 52/028

FOREIGN PATENT DOCUMENTS

| CN | 104422069   |   | 3/2015  |
| CN | 104422069 A | * | 3/2015  |
| CN | 105338040 A | * | 2/2016  |
| CN | 105808301   |   | 7/2016  |
| CN | 107490155   |   | 12/2017 |

OTHER PUBLICATIONS

First Chinese Office Action, issued in the corresponding Chinese patent application No. 201711471263.0, dated Mar. 4, 2020, 14 pages.

* cited by examiner

Fig. 8

METHOD, APPARATUS AND MEDIUM FOR TIMING CONTROL IN AN ELECTRONIC DEVICE

CROSS REFERENCE TO RELATED APPLICATIONS

This application is a U.S. National Stage Application under 35 U.S.C. § 371 of International Application No. PCT/CN2018/109023, which claims priority to the Chinese Patent Application No. 201711471263.0, filed on Dec. 28, 2017, entitled "METHOD, APPARATUS AND MEDIUM FOR TIMING CONTROL OF ELECTRONIC DEVICE," which is incorporated herein by reference in its entirety.

TECHNICAL FIELD

The present disclosure relates to the field of electronic technology, and more particularly, to a method, an apparatus and a medium for timing control of an electronic device.

BACKGROUND

In some application scenes of intelligent electronic devices, users may have a strong desire to control the electronic devices to perform various actions in a timing manner. For example, a user may expect to control a smart light to turn on at a certain time on a certain day and turn off at another time, or the user may expect to control a smart socket to be turned on for a certain period of time and then turned off. At present, users can send timing control instructions to control ends of electronic devices through terminal devices, so as to realize timing control for action executions of electronic devices.

In the process of implementing the concept of the present disclosure, the inventors found that at least the following problems exist in the prior art: in the prior art, one single timing control instruction can only define one action of the electronic device, or a simple periodic repetition of the action. In this way, the existing timing control method cannot enable the electronic device to perform associated different actions at different time points through a one-time setting, and cannot meet the requirements of complex timing scenes.

SUMMARY

In view of this, the present disclosure provides a method, an apparatus and a medium for timing control of an electronic device, which enable a user to control the electronic device to perform associated different actions at different time points through one single timing control instruction.

One aspect of the present disclosure provides a method for timing control of an electronic device, comprising:

receiving a timing control instruction for the electronic device from a user, the timing control instruction comprises controlling the electronic device to operate repeatedly during N continuous time periods with the same certain time duration, wherein N is a positive integer greater than or equal to 2, and each time period at least comprises a first sub-time period and a second sub-time period, wherein controlling an operation of the electronic device during each time period comprises:

controlling the electronic device to perform a first action at a first time point which is a beginning of the time period;

controlling the electronic device to perform a second action different from the first action, in response to the first sub-time period having elapsed since the first time point, and controlling the electronic device according to the timing control instruction.

According to an embodiment of the present disclosure, each time period further comprises a third sub-time period, wherein controlling the operation of the electronic device during each time period further comprises: controlling the electronic device to perform a third action different from the second action, in response to the second sub-time period having elapsed since the second action was performed.

According to an embodiment of the present disclosure, the third action is different from the first action or the same as the first action.

According to an embodiment of the present disclosure, controlling the electronic device according to the timing control instruction comprises: acquiring an action to be performed at a current time point by the electronic device from the timing control instruction; controlling the electronic device to perform the action to be performed at the current time point; and waiting for controlling the electronic device to perform another action in response to a sub-time period corresponding to the other action having elapsed, if the other action exists in the timing control instruction; or terminating the timing control of the electronic device, if there is no other action in the timing control instruction.

Another aspect of the present disclosure provides an apparatus for timing control of an electronic device, comprising:

one or more processors; and a storage device for storing one or more programs, wherein the one or more processors is configured to execute the one or more programs, so as to:

receive a timing control instruction for the electronic device from a user, the timing control instruction comprises controlling the electronic device to operate repeatedly during N continuous time periods with the same certain time duration, wherein N is a positive integer greater than or equal to 2, and each time period at least comprises a first sub-time period and a second sub-time period, wherein controlling an operation of the electronic device during each time period comprises:

controlling the electronic device to perform a first action at a first time point which is a beginning of the time period;

controlling the electronic device to perform a second action different from the first action, in response to the first sub-time period having elapsed since the first time point, and control the electronic device according to the timing control instruction.

According to an embodiment of the present disclosure, each time period further comprises a third sub-time period, wherein the one or more processors is further configured to execute the one or more programs, so as to: control the electronic device to perform a third action different from the second action, in response to the second sub-time period having elapsed since the second action was performed.

According to an embodiment of the present disclosure, the third action is different from the first action or the same as the first action.

According to an embodiment of the present disclosure, the one or more processors is further configured to execute the one or more programs, so as to: acquire an action to be performed at a current time point by the electronic device from the timing control instruction; control the electronic device to perform the action to be performed at the current time point; and wait for controlling the electronic device to perform another action in response to a sub-time period corresponding to the other action having elapsed, if the other action exists in the timing control instruction; or terminate the timing control of the electronic device, if there is no other action in the timing control instruction.

Another aspect of the present disclosure provides a non-transient computer-readable medium having executable instructions stored thereon that, when being executed by a processor, cause the processor to perform operations comprising:

receiving a timing control instruction for the electronic device from a user, the timing control instruction comprises controlling the electronic device to operate repeatedly during N continuous time periods with the same certain time duration, wherein N is a positive integer greater than or equal to 2, and each time period at least comprises a first sub-time period and a second sub-time period, wherein controlling an operation of the electronic device during each time period comprises:

controlling the electronic device to perform a first action at a first time point which is a beginning of the time period;

controlling the electronic device to perform a second action different from the first action, in response to the first sub-time period having elapsed since the first time point, and controlling the electronic device according to the timing control instruction.

According to an embodiment of the present disclosure, the instructions, when being executed by a processor, cause the processor to perform operations comprising: controlling the electronic device to perform a third action different from the second action, in response to the second sub-time period having elapsed since the second action was performed.

According to an embodiment of the present disclosure, the third action is different from the first action or the same as the first action.

According to an embodiment of the present disclosure, the instructions, when being executed by a processor, cause the processor to perform operations comprising: acquiring an action to be performed at a current time point by the electronic device from the timing control instruction; controlling the electronic device to perform the action to be performed at the current time point; and waiting for controlling the electronic device to perform another action in response to a sub-time period corresponding to the other action having elapsed, if the other action exists in the timing control instruction; or terminating the timing control of the electronic device, if there is no other action in the timing control instruction.

BRIEF DESCRIPTION OF THE ACCOMPANYING DRAWINGS

The above and other objects, features, and advantages of the present disclosure will be more apparent through the following description of embodiments of the present disclosure with reference to the accompanying drawings, in which.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and technologies are omitted to avoid unnecessarily obscuring the concepts of the present disclosure.

The terminology used herein is for the purpose of describing specific embodiments only and is not intended to limit the disclosure. As used herein, the terms "including", "comprising" and the like indicate the presence of features, steps, operations, and/or components, but do not exclude the presence or addition of one or more other features, steps, operations, or components.

All terms (including technical and scientific terms) used herein have the meaning commonly understood by those skilled in the art unless otherwise defined. It should be noted that the terms used herein should be interpreted to have meanings consistent with the context of the description, and should not be interpreted in an idealized or overly rigid manner.

In a case that expressions such as "at least one of A, B, C, etc." are used, they should generally be interpreted in accordance with the meaning commonly understood by those skilled in the art (for example, "a system having at least one of A, B and C" shall include but is not limited to a system having A alone, B alone, C alone, A and B, A and C, B and C, and/or A, B, C, etc.). In a case that expressions such as "at least one of A, B, or C" are used, they should generally be interpreted in accordance with the meaning commonly understood by those skilled in the art (for example, "a system having at least one of A, B or C" shall include but is not limited to a system having A alone, B alone, C alone, A and B, A and C, B and C, and/or A, B, C, etc.). Those skilled in the art should also understand that transition conjunctions and/or phrases that essentially arbitrarily represent two or more optional items, whether in the description, the claims, or the accompanying drawings, should be understood as giving possibility of including one or either or both of the items. For example, the phrase "A or B" should be understood to include the possibility of "A" or "B", or "A and B".

Embodiments of the present disclosure provide a method, an apparatus, and a medium for timing control of an electronic device. The method comprises receiving a timing control instruction for the electronic device from a user, and controlling the electronic device according to the timing control instruction. The timing control instruction comprises controlling actions performed by the electronic device at different time points with at least the actions performed at two time points being different.

In this way, the method for timing control of an electronic device according to an embodiment of the present disclosure can enable the user to control the electronic device to perform different actions at different time points through a one-time setting of one single timing control instruction, facilitating in the timing control operation of the associated actions performed by the electronic device at different time points, and satisfying the user's diversity needs more flexibly.

Figure 1:
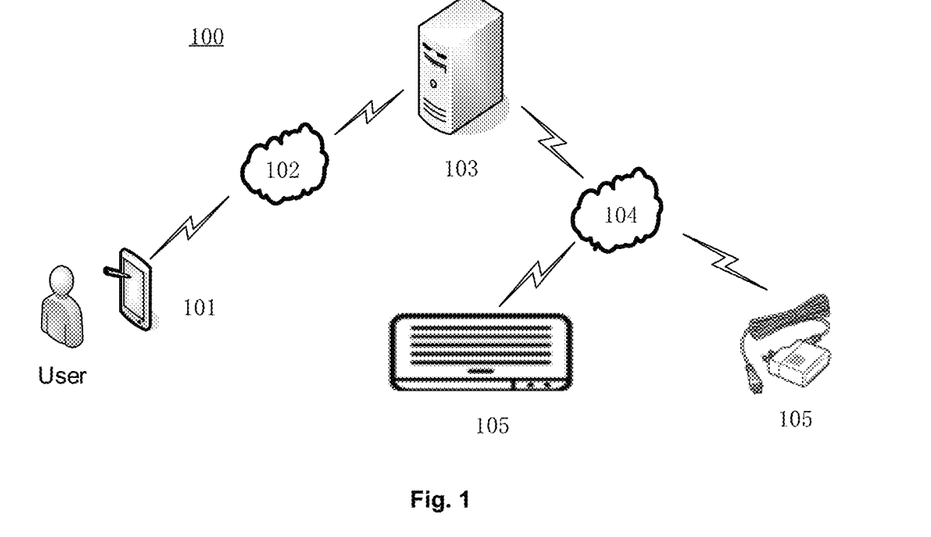
FIG. 1 schematically illustrates an application scene of a method and apparatus for timing control of an electronic device according to an embodiment of the present disclosure.

FIG. 1 schematically illustrates an application scene of a method and apparatus for timing control of an electronic device according to an embodiment of the present disclosure. It should be noted that FIG. 1 is only an example of the application scene to which the embodiments of the present disclosure can be applied, so as to help those skilled in the art to understand the technical contents of the present disclosure. However, this does not mean that the embodiments of the present disclosure cannot be applied to other apparatuses, systems, environments, or scenes.

As shown in FIG. 1, a system architecture 100 according to this embodiment may comprise a terminal device 101, a server 103, a network 102 for connecting the terminal device 101 with the server 103, an electronic device 105, and a network 104 for connecting the server 103 and the electronic device 105.

The network 102 and the network 104 may include various types of connection, such as wired, wireless communication links or fiber optic cables, etc. In some embodiments, the network 102 and the network 104 may also be the same network, or networks with partial overlap.

A user can use the terminal device 101, so as to interact with the server 103 via the network 102 for receiving or sending messages. For example, the user may use the terminal device 101 to send the server 103 a timing control instruction for the electronic device 105. The server 103 may collect the control execution result of the electronic device 105 and feed it to the terminal device 101 for being reviewed by the user.

The server 103 may interact with the electronic device 105 via the network 104 so as to receive and send messages. For example, the server 103 may send a control signal in a timing manner to the electronic device 105 based on the timing control instruction received, so as to control the execution action of the electronic device 105. The server 103 may also receive various types of feedback information sent by the electronic device 105, such as the current operating status of the electronic device 105.

In some embodiments, the terminal device 101 may be various types of electronic devices having a display screen and supporting web browsing, including but not limited to a smart phone, a tablet computer, a laptop computer, and a desktop computer. In some embodiments, the terminal device 101 may also be an electronic device that does not have a display screen but can receive a timing control instruction input by the user in various forms such as a voice.

In some embodiments, various electronic device control applications (APPs) and the like may be installed on the terminal device 101. The user can control various functions of the electronic device 105 through these control applications.

In some embodiments, the server 103 may be a server that provides various services, such as a background management server (only an example) that provides support for the timing control instruction that is sent by the user via the terminal device 101. The background management server may perform an analyzing process on data such as the received timing control instruction, and obtain or generate a corresponding control signal queue based on the timing control instruction, and send, at a corresponding time point, a control signal corresponding to the time point to the electronic device 105, so as to control the action of the electronic device 105.

In some embodiments, the server 103 may be various cloud servers. In some embodiments, the server 103 may be other electronic device capable of receiving the timing control instruction and controlling the electronic device 105, such as a controller of the electronic device 105.

In some embodiments, the terminal device 101, the network 102 and the server 103 may be combined into an electronic device, so as to achieving the controlling of the operation of the electronic device 105 based on the user's timing control instruction.

In some embodiments, the server 103 may provide services such as registration of the electronic device 105, remote control of the terminal device, storage of the timing control instruction, or reporting of the operating status of the electronic device 105 and the like.

The electronic device 105 according to the embodiments of the present disclosure may include at least one of: a smart phone, a tablet personal computer, a mobile phone, a video phone, an electronic book reader (e-book reader), a desktop PC, a laptop PC, a netbook computer, a work station, a server, a personal digital assistants (PDA), a portable multimedia player (PMP), MPEG-1 audio layer-3 (MP3) player, a mobile medical device, a camera, and a wearable device. According to various embodiments, the wearable device may have a type comprising at least one of: accessory type (e.g., watch, ring, bracelet, anklet, necklace, glasses, contact lens or head mounted device (HMD)), fabric or clothing integration type (such as electronic clothing), body attachment type (such as skin patches or tattoos), and bio-implant type (such as implantable circuits).

According to some embodiments, the electronic device 105 can be an intelligent home device, which may include at least one of: TV, digital video disk (DVD) player, audio device, refrigerator, air conditioner, vacuum cleaner, oven, microwave oven, washing machine, air purifier, set-top box, home automatic control panel, security control panel, TV box, game console, electronic dictionary, electronic key, camera and digital photo frame.

According to another embodiment, the electronic device 105 may include at least one of: various medical devices (e.g., various portable medical measurement devices (blood glucose monitoring device, heart rate monitoring device, blood pressure measurement device, body temperature measurement device, etc.), magnetic resonance angiography (MRA), magnetic resonance imaging (MRI), computed tomography (CT) machine and ultrasound scanner), navigation equipment, global positioning system (GPS) receiver, event data recorder (EDR), flight data recorder (FDR), vehicle infotainment equipment, marine electronic equipment (such as marine navigation equipment and compass), avionics, safety equipment, vehicle head unit, industrial or household robot, bank's automated teller machine (ATM), store's point of sale or Internet of things (e.g. light bulbs, various sensors, meters or gas meters, sprinkler equipment, fire alarms, thermostats, streetlights, toasters, sports equipment, hot water tanks, heaters, boilers, etc.).

According to some embodiments, the electronic device 105 may include at least one of: a part of furniture or building/structure, electronic board, electronic signature receiving apparatus, projector, and various measuring instruments (e.g. water meters, electricity meters, gas meters and radio wave meter). In various embodiments, the electronic device 105 may be a combination of one or more of the various devices described above.

The electronic device 105 according to some embodiments of the present disclosure may be a flexible device. In addition, the electronic device 105 according to the embodiments of the present disclosure is not limited to the above-mentioned devices, and may include new types of electronic devices developed with technology.

It should be noted that the method for timing control of an electronic device provided by the embodiments of the present disclosure may generally be performed by the server 103. Accordingly, the apparatus for timing control of an electronic device according to the embodiments of the present disclosure may generally be provided in the server 103. The method for timing control of an electronic device according to the embodiments of the present disclosure may also be performed by a server or a server cluster different from the server 103 and capable of communicating with the terminal device 101, the electronic device 105 and/or the server 103. Accordingly, the apparatus for timing control of an electronic device provided in the embodiments of the present disclosure may also be provided in a server or a server cluster different from the server 103 and capable of communicating with the terminal device 101, the electronic device 105 and/or the server 103.

It should be understood that the numbers of terminal devices, networks, servers, and electronic devices in FIG. 1 are merely exemplary. According to implementation needs, more or less terminal devices, networks, servers and electronic devices may be used.

Figure 2:
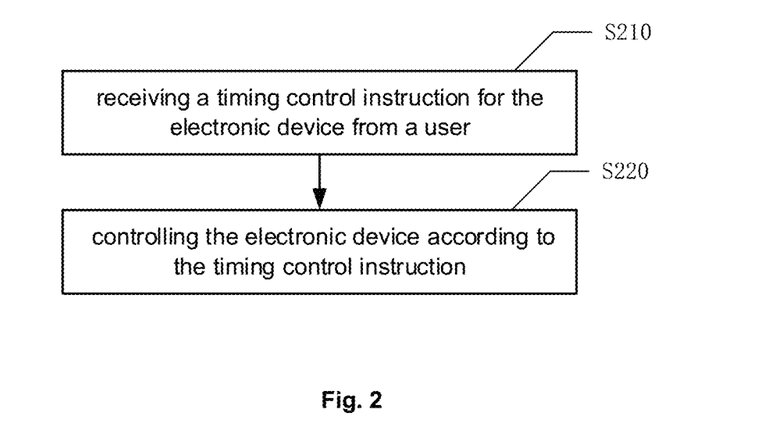
FIG. 2 schematically illustrates a flowchart of a method for timing control of an electronic device according to an embodiment of the present disclosure.

FIG. 2 schematically illustrates a flowchart of the method for timing control of the electronic device 105 according to an embodiment of the present disclosure.

As shown in FIG. 2, the method comprises operations S210 and S220.

In operation S210, a timing control instruction for the electronic device 105 is received from the user. The timing control instruction comprises controlling actions performed by the electronic device 105 at different time points with at least the actions performed at two time points being different.

Then, in operation S220, the electronic device 105 is controlled according to the timing control instruction.

Figure 3:
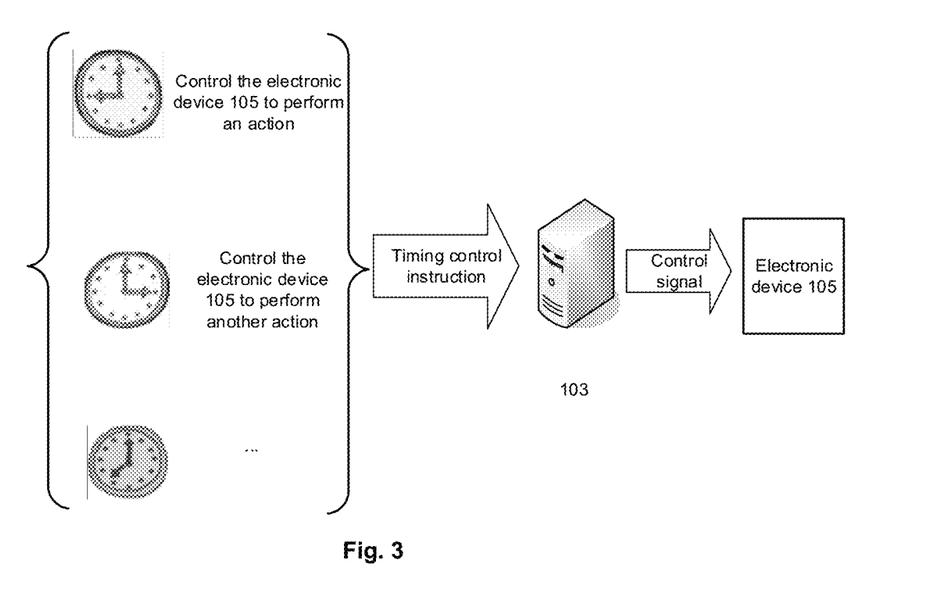
FIG. 3 schematically illustrates a conceptual diagram of a method for timing control of an electronic device according to an embodiment of the present disclosure.

Specifically, the concept of the method for timing control of the electronic device 105 according to the embodiment of the present disclosure can be more clearly understood with reference to the schematic of FIG. 3. FIG. 3 schematically illustrates a conceptual diagram of the method for timing control of the electronic device 105 according to an embodiment of the present disclosure.

In operation S210, the server 103 receives a timing control instruction for the electronic device 105 from the user. As shown in FIG. 3, the timing control instruction comprises controlling the electronic device 105 to perform actions at different time point with at least the actions performed at two time points being different.

For example, when the electronic device 105 is an air conditioner, assuming that the application scenario is a certain day in summer, the timing control instruction may control the air conditioner to set the temperature to 23° C. at 9:00, set the temperature to 20° C. at 15:00, and turn off the air conditioner at 19:00.

Thereafter, in operation S220, the server 103 controls the operation of the electronic device 105 based on the received timing control instruction.

Figure 4:
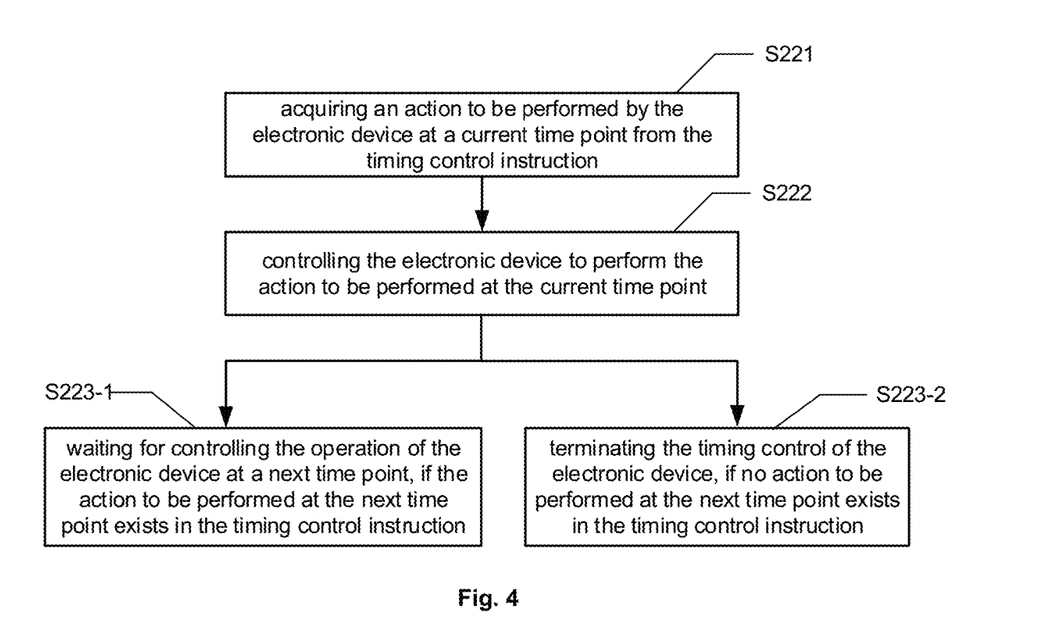
FIG. 4 schematically illustrates a flowchart of a method for controlling an electronic device based on a timing control instruction according to an embodiment of the present disclosure.

Specifically, according to the embodiments of the present disclosure, the manner in which the server 103 controls the operation of the electronic device 105 may refer to the example of FIG. 4.

FIG. 4 schematically illustrates a method flowchart of operation S220 in which the electronic device 105 is controlled based on the timing control instruction according to an embodiment of the present disclosure.

As shown in FIG. 4, operation S220 may comprise operation S221, operation S222, and operation S223-1 or operation S223-2.

In operation S221, an action to be performed at a current time point by the electronic device 105 is acquired from the timing control instruction.

In operation S222, the electronic device is controlled to perform the action to be performed at the current time point.

In operation S223-1, the method further comprises waiting for controlling the operation of the electronic device 105 at a next time point, if the action to be performed at the next time point exists in the timing control instruction.

In operation S223-2, the method further comprises terminating the timing control of the electronic device 105, if no action to be performed at the next time point exists in the timing control instruction.

Specifically, continue to take the timing control instruction for the air conditioner as an example, the server 103 checks whether the action to be performed by the electronic device 105 at the current time point exists according to the timing control instruction for the air conditioner in a round-robin fashion. At 9:00, it is acquired in operation S221 that the action to be performed by the air conditioner at present is to set the temperature to 23° C. Then, in operation S222, the air conditioner is controlled to set the temperature to 23° C. Thereafter, the timing control instruction for the air conditioner also comprises an action to be performed at the next time point (for example, set the air conditioner temperature to 20° C. at 5:00). Then, operation S223-1 is performed so as to wait for controlling the temperature setting of the air conditioner again at 15:00.

Similarly, the server performs operation S221 and operation S222 at 15:00, so as to control the air conditioner to set the temperature to 20° C., and then performs operation S223-1 to wait for controlling the air conditioner again at 19:00.

Next, the server performs operation S221 and operation S222 at 19:00, so as to control the air conditioner to be turned off. Thereafter, there is no action to be performed at the next time point in the timing control instruction for the air conditioner. At this time, operation S223-2 is performed to terminate the timing control of the air conditioner.

In this way, the user can control the whole day operation of the air conditioner by one-time setting of one single timing control instruction, so that the whole day operation of the air conditioner at different time points can satisfy user's complex requirements.

In this way, the method for timing control of the electronic device according to the embodiment of the present disclosure can enable the user to control the electronic device 105 to perform different actions at different time points through one-time setting of one single timing control instruction according to needed, facilitating in the timing control operation of the associated actions performed by the electronic device 105 at different time points, and satisfying the user's diversity needs more flexibly According to the embodiments of the present disclosure, at least two of the actions to be performed at different time points comprised in the timing control instruction are different.

Specifically, the timing control instruction may comprise controlling the actions to be performed by the electronic device 105 at two time points. For example, the timing control instruction for the air conditioner in the above example may only comprise control of the actions to be performed by the air conditioner at two time points. For example, the timing control instruction for the air conditioner may directed to control the air conditioner to set the temperature to 22° C. at 9:00 and set the temperature to 25° C. at 19:00.

Alternatively, the timing control instruction may also comprise controlling the electronic device 105 to perform actions at more than two time points, wherein at least the actions performed at two time points are different.

For example, the timing control instruction for the air conditioner in the above example may also comprise execution actions at three time points, wherein the execution actions at two time points are the same, and the other is different. For example, the timing control instruction for the air conditioner may be to control the air conditioner to set the temperature to 23° C. at 9:00, set the temperature to 20° C. at 15:00, and set the temperature to 23° C. at 19:00.

According to the embodiments of the present disclosure, in different scenarios, for the actions comprised in the timing control instruction to be performed by the electronic device at different time points, the concepts of different time points may also be different.

In living scenarios, it will be found that in different occasions or situations, the user's concern about time is different.

In some scenarios, users are more interested in the moment. For example, during the working day, the office lights up at 7:00 in the morning and lights off at 20:00 in the evening. In this scenario, users focus on two time points, 7:00 and 20:00. At this time, the different time points in the timing control instruction may be user-defined different time points.

In other scenarios, users may be interested in the duration of time period. For example, it takes half an hour to charge a mobile phone from the beginning to the end. In this scenario, users focus on the duration of the time period. At this time, the different time points in the timing control instruction may be the beginning and end of the time period.

In other scenarios, users may be interested in the time duration and time interval both. For example, users may expect an intelligent fan to be turned off for 10 minutes after operating for an hour, and then turned off for 10 minutes after operating for another hour, which will not be powered off until N times of operation are completed. At this time, the different time points in the timing control instruction can be N time periods with the same certain time duration, each of which can be divided into two sub-time periods.

According to the embodiments of the present disclosure, for the actions comprised in the timing control instruction to be performed by the electronic device at different time points, the concepts of different time points may also be different depending on the application scenario, thereby effectively adapting to the user's habits and facilitating the user's use.

Figure 5A:
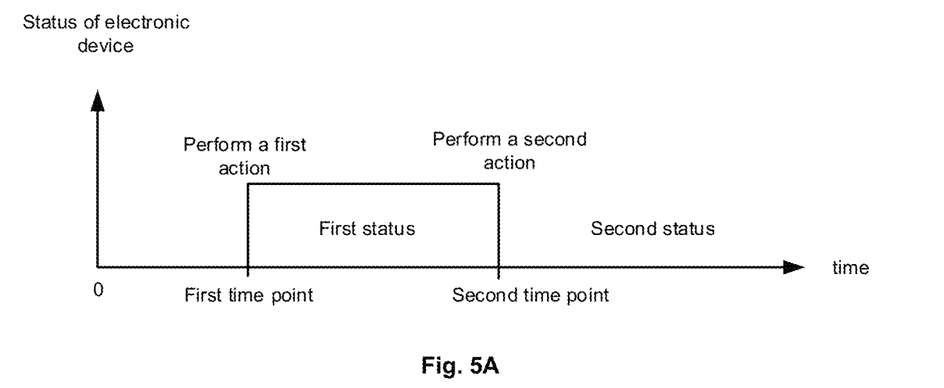
FIG. 5A to FIG. 5C schematically illustrate diagrams of timing control instructions with different contents according to embodiments of the present disclosure.
Figure 5B:
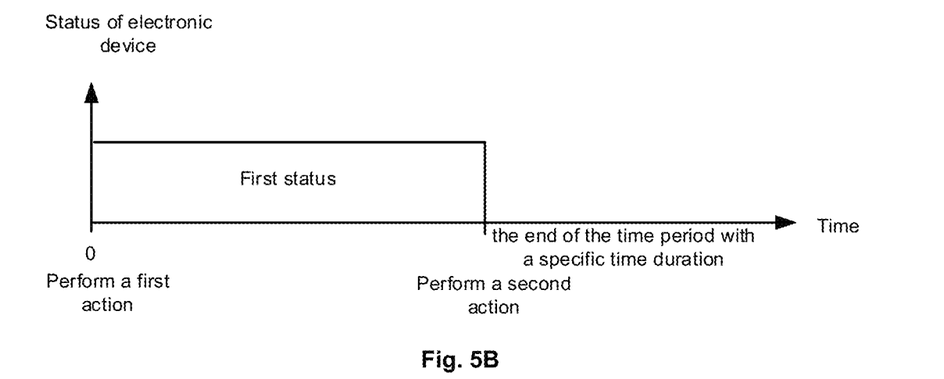
Figure 5C:
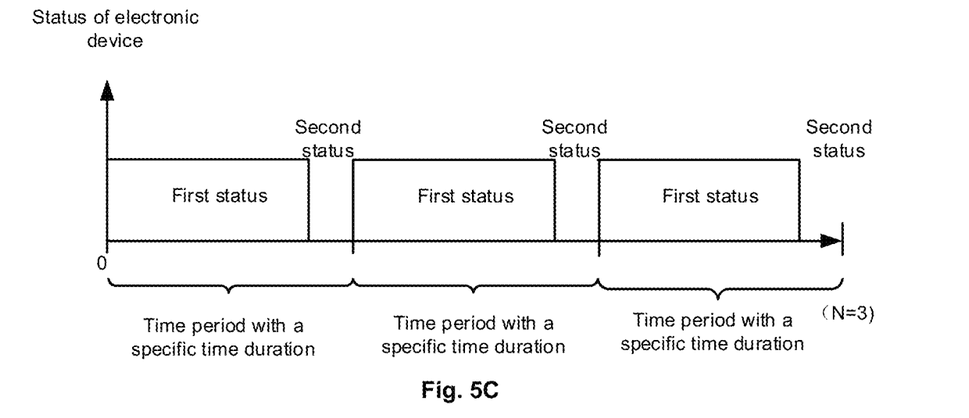

FIG. 5A-FIG. 5C schematically illustrate diagrams of timing control instructions with different contents according to the embodiments of the present disclosure.

FIG. 5A schematically illustrates a diagram of a timing control instruction according to an embodiment of the present disclosure.

As shown in FIG. 5A, the timing control instruction comprises controlling the electronic device 105 to perform actions at different time points, among which, at least the actions performed at two time points are different. In particular, this includes controlling the electronic device 105 to perform a first action at a first time point, and controlling the electronic device 105 to perform a second action at a user-defined second time point following the first time point.

Specifically, the electronic device 105 is controlled to perform a first action, such as initiating the operation, at a user-defined first time point, so that the electronic device 105 is in a first state (for example, an ON state) after the first time point. Then, the electronic device 105 is controlled to perform a second action, such as terminating the operation, at a user-defined second time point, so that the electronic device 105 is in a second state (for example, an OFF state) after the second time point. Accordingly, the state of the electronic device 105 changes over time as shown in FIG. 5A.

According to the embodiment of the present disclosure, the timing control instruction focuses on user-defined different time points, and is applicable to events or situations where the user used to focus on the moment.

According to some embodiments of the present disclosure, the electronic device 105 may be controlled by one single timing control instruction to perform associated different actions at user-defined different time points.

FIG. 5B schematically illustrates a diagram of a timing control instruction according to another embodiment of the present disclosure.

As shown in FIG. 5B, the timing control instruction comprises controlling the electronic device 105 to perform actions at different time points, among which, at least the actions performed at two time points are different. In particular, this includes controlling the electronic device 105 to perform a first action at a beginning of a time period with a certain time duration, and controlling the electronic device 105 to perform a second action at an end of the time period with the certain time duration.

Specifically, for example, the electronic device 105 is controlled to immediately perform the first action at the beginning of the time period with the certain time duration (for example, the time point when the smart charger is plugged into the socket is considered as the beginning of the time period with the certain time duration, that is, the charging begins when the smart charger is plugged into the socket), and then the electronic device 105 is in a first state. When the electronic device 105 keeps in the first state until the end of the time period with the certain time duration, and then perform a second action (for example, after the smart charger is plugged into the socket and charged for one hour, the smart charger is disconnected from the power source).

According to the embodiment of the present disclosure, the different time points in the timing control instruction focus on the beginning and the end of the time period with the certain time duration, which is applicable to events or situations where the users used to focus on the duration of a time period.

According to an embodiment of the present disclosure, the electronic device 105 may be controlled by one single timing control instruction to perform different actions at the beginning and the end of a time period.

FIG. 5C schematically illustrates a diagram of a timing control instruction according to another embodiment of the present disclosure.

As shown in FIG. 5C, the timing control instruction comprises controlling the electronic device 105 to perform actions at different time points, among which, at least the actions performed at two time points are different. In particular, this includes controlling a repeated operation of the electronic device during N time periods with the same certain time duration, where N is a positive integer greater than or equal to 2, and one of two adjacent time periods has its beginning/end coincident with the end/beginning of the other, each of the time periods being divided into at least two sub-time periods. Controlling the operation of the electronic device 105 in each of the N time periods comprises controlling, at a beginning of a corresponding time period, the electronic device to perform a first action, and controlling, at a respective end of the at least two sub-time periods except for the end of the corresponding time period, the electronic device to perform an action corresponding to the respective end of a corresponding sub-time period.

For example, as shown in FIG. 5C, N is 3. The operation of the electronic device 105 is controlled to be repeated over three time periods with the certain time durations. The three time periods with the certain time duration are connected head to tail. Each of the time periods with the certain time duration is divided into two sub-time periods (of course, in some embodiments, more sub-time periods can also be divided). At the beginning of each of the time periods with the certain time duration, the electronic device 105 is controlled to perform the first action, such as initializing the operation, so that the electronic device 105 is in a first state. Then, after the first state is maintained for a sub-time period, a second action is performed to enable the electronic device to be in a second state. Thereafter, at the end of the current time period with the certain time duration (i.e. the beginning of the next time period with the certain time duration), the control actions during the time period with the certain time duration is repeated. Thus, in each of the time periods with the certain time duration, the electronic device 105 is in the first state during the preceding sub-time period, for example, the fan is in an ON state, and the electronic device 105 is in the second state during the next sub-time period, for example, the fan is in an OFF state. After repeating the operation three times, the timing control is terminated.

In this way, the electronic device 105 operates in the first state for a sub-time period, and then switches into the second state, and the electronic device 105 switches back to the first state after another sub-time period. With such repetition, the electronic device 105 can be controlled to perform different actions alternately at a certain time interval until the number of times reaches its upper limit set in the timing control instruction According to the embodiment of the present disclosure, the concept of different time points in the timing control instruction focuses on both the time duration and the time interval, which is applicable to events or situations where users used to focus on alternate execution at a certain time interval.

According to the embodiment of the present disclosure, the electronic device 105 may be controlled through one single timing control instruction to perform different actions alternately at a time interval.

According to the embodiment of the present disclosure, in practical applications the specific content of the timing control instruction may be any combination of the three forms shown in FIG. 5A-FIG. 5C. The timing control instruction may further comprise repeating different actions to be performed at different time points every few days or at a fixed date every month.

Figure 6A:
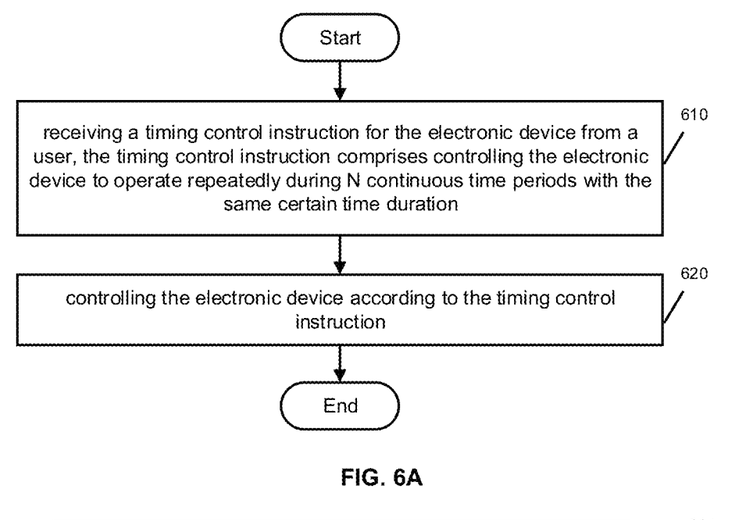
FIG. 6A to FIG. 6C shows a flowchart diagram of the timing control method shown in FIG. 5C.
Figure 6B:
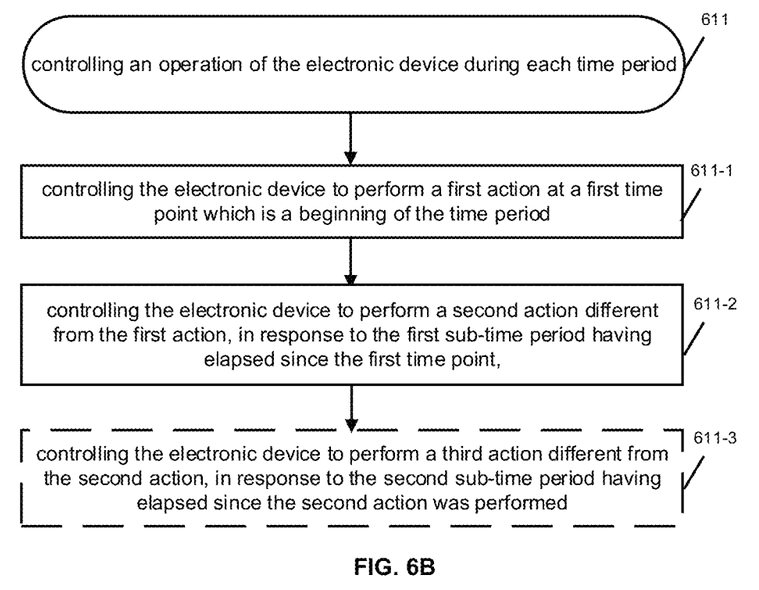
Figure 6C:
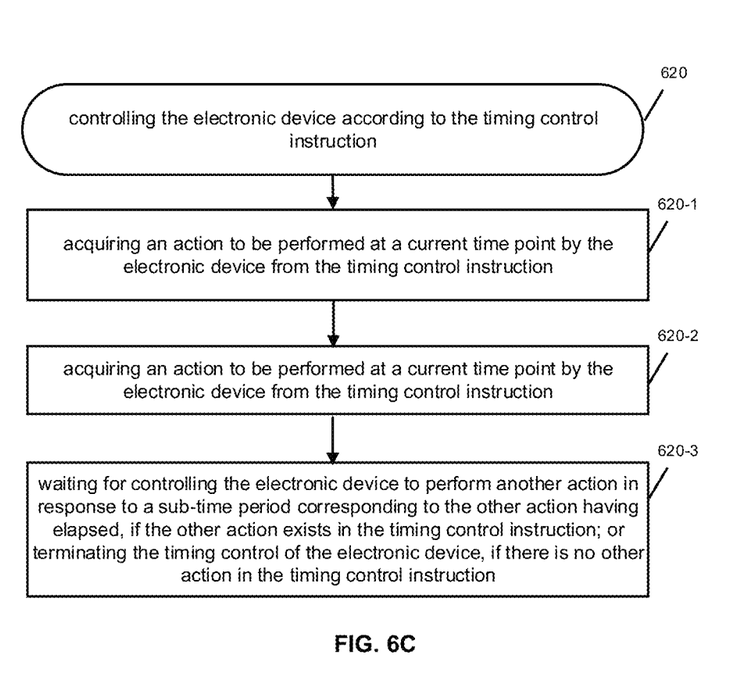

FIG. 6A to FIG. 6C shows a flowchart diagram of the timing control method shown in FIG. 5C.

As shown in FIG. 6A, the timing control method may comprise step 610, i.e., receiving a timing control instruction for the electronic device from a user, the timing control instruction comprises controlling the electronic device to operate repeatedly during N continuous time periods with the same certain time duration, wherein N is a positive integer greater than or equal to 2, and each time period at least comprises a first sub-time period and a second sub-time period, and Step 620, controlling the electronic device according to the timing control instruction.

For example, the step 610 of controlling the electronic device to operate repeatedly during N continuous time periods with the same certain time duration may specifically comprise step 611 of controlling the operation of the electronic device during each time period. As shown in FIG. 6B, step 611 may comprise: step 611-1 and step 611-2. In step 611-1, the electronic device is controlled to perform a first action at a first time point which is a beginning of the time period. In step 611-2, the electronic device is controlled to perform a second action different from the first action, in response to the first sub-time period having elapsed since the first time point.

Additionally, each time period may further comprise a third sub-time period. At this time, Step 611 may further comprise step 611-3, in which the electronic device is controlled to perform a third action different from the second action, in response to the second sub-time period having elapsed since the second action was performed. The third action may be different from the first action or the same as the first action.

In addition, as shown in FIG. 6C, step 620 may further comprise: in step 620-1, acquiring an action to be performed at a current time point by the electronic device from the timing control instruction; in step 620-2, controlling the electronic device to perform the action to be performed at the current time point; and in step 620-3, waiting for controlling the electronic device to perform another action in response to a sub-time period corresponding to the other action having elapsed, if the other action exists in the timing control instruction; or terminating the timing control of the electronic device, if there is no other action in the timing control instruction.

Figure 7:
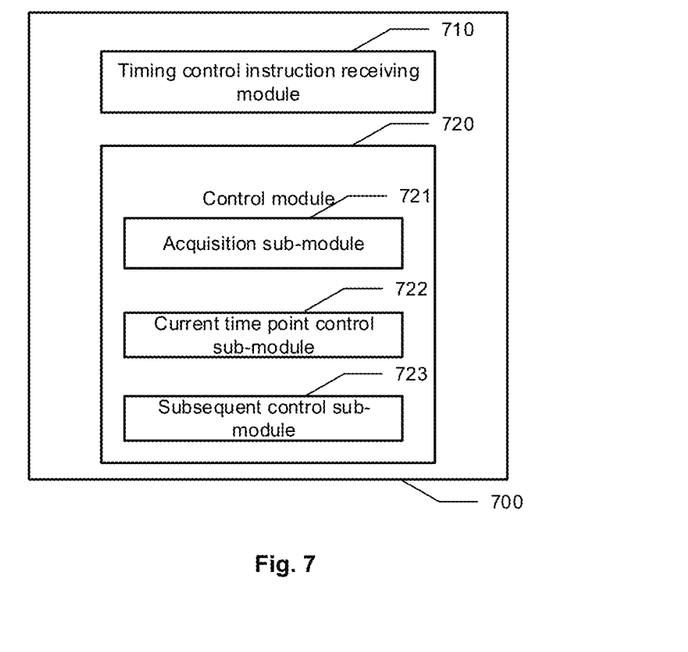
FIG. 7 schematically illustrates a block diagram of an apparatus for timing control of an electronic device according to an embodiment of the present disclosure.

FIG. 7 schematically illustrates a block diagram of an apparatus for timing control of the electronic device 105 according to an embodiment of the present disclosure.

As shown in FIG. 7, an apparatus 700 for timing control of the electronic device comprises a timing control instruction receiving module 710 and a control module 720. The apparatus 700 may be configured to perform the method according to the embodiments of the present disclosure described with reference to FIG. 2 to FIG. 6C.

The timing control instruction receiving module 710 is configured to receive a timing control instruction for the electronic device 105 from a user, the timing control instruction comprising controlling actions performed by the electronic device 105 at different time points with at least the actions performed at two time points being different The control module 720 is configured to control the electronic device 105 based on the timing control instruction.

The apparatus 700 for timing control of an electronic device according to the embodiment of the present disclosure can enable a user to control the electronic device 105 to perform different actions at different time points through a one-time setting of one single timing control instruction according to needs, facilitating in the timing control operation of the associated actions performed by the electronic device 105 at different time points, and satisfying the user's diversity needs more flexibly.

According to the embodiment of the present disclosure, the timing control instruction receiving module 710 is further configured to control the electronic device 105 to perform a first action at a first time point; and control the electronic device 105 to perform a second action at a user-defined second time point following the first time point.

According to the embodiment of the present disclosure, the electronic device 105 may be controlled by one single timing control instruction to perform associated different actions at user-defined different time points.

According to the embodiment of the present disclosure, the timing control instruction receiving module 710 is further configured to control the electronic device 105 to perform a first action at a beginning of a time period with a certain time duration, and control the electronic device 105 to perform a second action at an end of the time period with the certain time duration.

According to the embodiment of the present disclosure, the electronic device 105 may be controlled by one single timing control instruction to perform associated different actions at user-defined different time points.

According to the embodiment of the present disclosure, the timing control instruction receiving module 710 is further configured to control a repeated operation of the electronic device 105 during N time periods with the same certain time duration, where N is a positive integer greater than or equal to 2, and one of two adjacent time periods has its beginning/end coincident with the end/beginning of the other, each of the time periods being divided into at least two sub-time periods. The timing control instruction receiving module 710 is further configured to control the operation of the electronic device 105 in each of the N time periods by controlling, at a beginning of the time period, the electronic device 105 to perform a first action; and controlling, at a respective end of the at least two sub-time periods except for the end of the time period, the electronic device 105 to perform an action corresponding to the respective end.

According to the embodiment of the present disclosure, the electronic device 105 may be controlled by one single timing control instruction to perform different actions alternately at a time interval.

According to the embodiment of the present disclosure, the control module 720 comprises an acquisition sub-module 721, a current time point control sub-module 722 and a subsequent control sub-module 723.

The acquisition sub-module 721 is configured to acquire an action to be performed at a current time point by the electronic device 105 from the timing control instruction.

The current time point control sub-module 722 is configured to control the electronic device 105 to perform the action to be performed at the current time point.

The subsequent control sub-module 723 is configured to wait for controlling the operation of the electronic device 105 at a next time point, if the action to be performed at the next time point exists in the timing control instruction; or to terminate the timing control of the electronic device 105, if no action to be performed at the next time point exists in the timing control instruction.

It can be understood that, any plurality of the modules, sub-modules, units and sub-units according to the embodiment of the present disclosure, or at least part of the functions of any plurality of them may be implemented in one module. Any one or more of the modules, sub-modules, units, and sub-units according to the embodiment of the present disclosure may be implemented by being split into multiple modules. Any one or more of the modules, sub-modules, units, and sub-units according to the embodiment of the present disclosure may be at least partially implemented as a hardware circuit, such as field programmable gate array (FPGA), programmable logic array (PLA), system on chip, system on substrate, system on package, application specific integrated circuit (ASIC), or can be implemented by any other hardware or firmware in a reasonable manner that can integrate or package a circuit, or can be implemented by any of software, hardware and firmware or an appropriate combination of some of them. Alternatively, one or more of the modules, sub-modules, units and sub-units according to the embodiment of the present disclosure can be at least partially implemented as a computer program module that, when executed, is capable of performing the corresponding functions.

For example, the timing control instruction receiving module 710, the control module 720, the acquisition sub-module 721, the current time point control sub-module 722 and the subsequent control sub-module 723 can be combined into one module for implementation, or any one of them can be split into multiple modules. Alternatively, at least part of the functions of one or more of these modules may be combined with at least part of the functions of other modules and implemented in one module. According to the embodiment of the present disclosure, at least one of the timing control instruction receiving module 710, the control module 720, the acquisition sub-module 721, the current time point control sub-module 722 and the subsequent control sub-module 723 may be implemented at least partially as a hardware circuit, such as field programmable gate array (FPGA), programmable logic array (PLA), system on chip, system on substrate, system on package, application specific integrated circuit (ASIC), or any other hardware or firmware in a reasonable manner that can integrate or package a circuit, or can be implemented by an appropriate combination of software, hardware and firmware. Alternatively, at least one of the timing control instruction receiving module 710, the control module 720, the acquisition sub-module 721, the current time point control sub-module 722 and the subsequent control sub-module 723 may be at least partially implemented as a computer program module that, when executed, is capable of performing the corresponding functions.

Figure 8:
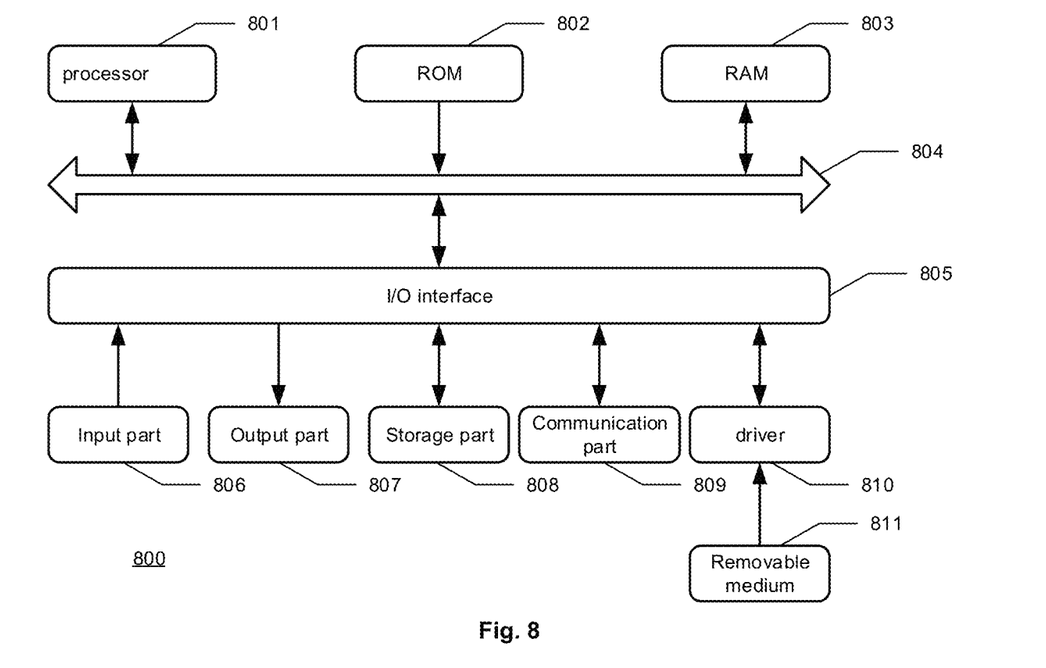
FIG. 8 schematically illustrates a block diagram of a computer system for timing control of an electronic device according to an embodiment of the present disclosure.

FIG. 8 schematically illustrates a block diagram of a computer system for timing control of the electronic device 105 according to an embodiment of the present disclosure. The computer system shown in FIG. 8 is only an example, and should not impose any limitation on the functions and scope of use of the embodiment of the present disclosure.

As shown in FIG. 8, a computer system 800 for timing control of the electronic device according to an embodiment of the present disclosure comprises a processor 801, which can perform various appropriate actions and processes based on programs stored in a read-only memory (ROM) 802 or programs loaded from a storage part 808 into a random access memory (RAM) 803. The processor 801 may include, for example, general-purpose microprocessor (for example, a CPU), instruction set processor and/or associated chipset and/or special-purpose microprocessor (for example, application specific integrated circuit (ASIC)), and so on. The processor 801 may also include on-board memory for caching purposes. The processor 801 may comprise a single processing unit or a plurality of processing units for performing different actions of the method flow according to the embodiments of the present disclosure described with reference to FIG. 2 to FIG. 6C.

In the RAM 803, various programs and data necessary for the operation of the system 800 are stored. The processor 801, the ROM 802 and the RAM 803 are connected to one another through a bus 804. The processor 801 performs various operations of the method for timing control of the electronic device 105 described with reference to FIG. 2 to FIG. 6C by executing the program in the ROM 802 and/or RAM 803. It should be noted that the program may also be stored in one or more memories other than the ROM 802 and the RAM 803. The processor 801 may also perform various operations of the method for timing control of the electronic device 105 described with reference to FIG. 2 to FIG. 6C by executing the program stored in the one or more memories.

According to the embodiment of the present disclosure, the system 800 may further comprise an input/output (I/O) interface 805, which is also connected to the bus 804. The system 800 may also comprise one or more of the following components connected to the I/O interface 805: an input part 806 including a keyboard, a mouse and the like; an output part 807 including, such as a cathode ray tube (CRT), a liquid crystal display (LCD) and the like, and a speaker, etc.; a storage part 808 including a hard disk, etc.; and a communication part 809 including a network interface card such as a LAN card, a modem, and the like. The communication part 809 performs communication processing via a network such as the Internet. A driver 810 is also connected to the I/O interface 805 as needed. A removable medium 811, such as a magnetic disk, an optical disk, a magneto-optical disk, a semiconductor memory, etc., is installed on the driver 810 as needed, so that a computer program read therefrom is installed to the storage part 808 as needed.

According to the embodiment of the present disclosure, the method described above with reference to the flowchart may be implemented as a computer software program. For example, the embodiment of the present disclosure comprises a computer program product comprising a computer program carried on a computer-readable medium, the computer program containing program code for performing the method shown in the flowchart. In such an embodiment, the computer program may be downloaded from a network and installed through the communication part 809, and/or installed from the removable medium 811. When the computer program is executed by the processor 801, the above functions defined in the system of the embodiment of the present disclosure are executed. According to the embodiment of the present disclosure, the systems, apparatuses, devices, modules, units, and the like described above may be implemented by computer program module.

It should be noted that the non-transient computer-readable medium shown in the present disclosure may be a computer-readable signal medium or a computer-readable storage medium or any combination of the two. The computer-readable storage medium may be, for example, but not limited to, electronic, magnetic, optical, electromagnetic, infrared, or semiconductor system, apparatus or device, or any combination thereof. More specific examples of computer-readable storage medium may include, but are not limited to: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any appropriate combination thereof. In the present disclosure, the computer-readable storage medium may be any tangible medium that contains or stores a program that can be used by or in combination with an instruction execution system, apparatus or device. In the present disclosure, the computer-readable signal medium may include a data signal in baseband or propagated as part of a carrier wave, which carries computer-readable program code. Such a propagated data signal may take many forms, including but not limited to electromagnetic signal, optical signal, or any appropriate combination thereof. The computer-readable signal medium may also be any computer-readable medium other than a computer-readable storage medium, and the computer-readable medium may send, propagate, or transmit a program for use by or in combination with an instruction execution system, apparatus or device. Program code embodied on the computer-readable medium may be transmitted using any appropriate medium, including but not limited to: wireless, wire, optical fiber, RF, etc., or any appropriate combination thereof. According to the embodiment of the present disclosure, the computer-readable medium may include the ROM 802 and/or the RAM 803 described above and/or one or more memories other than the ROM 802 and the RAM 803.

The flowcharts and block diagrams in the accompanying drawings illustrate architectures, functions and operations of possible implementations of the system, method and computer program product according to various embodiments of the present disclosure. In this regard, each block in the flowcharts or block diagrams can represent a module, a program segment, or a part of code, which contains one or more executable instructions to implement specified logic functions. It should also be noted that in some alternative implementations, the functions marked in the blocks may also occur in a different order than that marked in the accompanying drawings. For example, two successively represented blocks may actually be executed substantially in parallel, and they may sometimes be executed in the reverse order, depending on the functions involved. It should also be noted that each block in the block diagrams or flowcharts, and combinations of blocks in the block diagrams or flowcharts, can be implemented with a dedicated hardware-based system that performs the specified functions or operations, or can be implemented with a combination of dedicated hardware and computer instructions.

As another aspect, the present disclosure also provides a non-transient computer-readable medium, which may be included in the apparatus described in the above embodiment; or may exist alone without being assembled into the apparatus. The above-mentioned computer-readable medium carries one or more programs that, when executed by the apparatus, causes the apparatus to perform the method for timing control of an electronic device according to the embodiment of the present disclosure. The method comprises receiving a timing control instruction for the electronic device 105 from a user, and controlling the electronic device 105 based on the timing control instruction. The timing control instruction comprises controlling actions performed by the electronic device 105 at different time points with at least the actions performed at two time points being different.

According to the embodiment of the present disclosure, controlling actions performed by the electronic device 105 at different time points with at least the actions performed at two time points being different comprises controlling the electronic device 105 to perform a first action at a first time point, and controlling the electronic device 105 to perform a second action at a user-defined second time point following the first time point.

According to the embodiment of the present disclosure, controlling actions performed by the electronic device 105 at different time points with at least the actions performed at two time points being different comprises controlling the electronic device 105 to perform a first action at a beginning of a time period with the certain time duration, and controlling the electronic device 105 to perform a second action at an end of the time period with the certain time duration.

According to the embodiment of the present disclosure, controlling actions performed by the electronic device 105 at different time points with at least the actions performed at two time points being different comprises controlling a repeated operation of the electronic device 105 during N time periods with the same certain time duration, where N is a positive integer greater than or equal to 2, and one of two adjacent time periods has its beginning/end coincident with the end/beginning of the other, each of the time periods being divided into at least two sub-time periods. Controlling the operation of the electronic device 105 in each of the N time periods comprises controlling, at a beginning of the time period, the electronic device 105 to perform a first action; and controlling, at a respective end of the at least two sub-time periods except for the end of the time period, the electronic device 105 to perform an action corresponding to the respective end.

According to the embodiment of the present disclosure, controlling the electronic device 105 according to the timing control instruction comprises acquiring an action to be performed at a current time point by the electronic device 105 from the timing control instruction; controlling the electronic device 105 to perform the action to be performed at the current time point; and waiting for controlling the operation of the electronic device 105 at a next time point, if the action to be performed at the next time point exists in the timing control instruction; or terminating the timing control of the electronic device 105, if no action to be performed at the next time point exists in the timing control instruction.

The embodiments of the present disclosure have been described above. However, these embodiments are for illustrative purposes only, and are not intended to limit the scope of the present disclosure. Although the embodiments have been described separately above, this does not mean that the measures in the respective embodiments cannot be used in an advantageous combination. The scope of the present disclosure is defined by the appended claims and their equivalents. Without departing from the scope of the present disclosure, those skilled in the art can make various substitutions and modifications, and these substitutions and modifications should all fall within the scope of the present disclosure.

The invention claimed is:

1. A method for timing control of an electronic device, comprising:
  receiving a timing control instruction for the electronic device from a user, the timing control instruction comprises controlling the electronic device to operate repeatedly during N continuous time periods with a same certain time duration, wherein N is a positive integer greater than or equal to 2, and each time period at least comprises a first sub-time period and a second sub-time period, wherein controlling an operation of the electronic device during each time period comprises:
    controlling the electronic device to perform a first action at a first time point which is a beginning of the time period;
    controlling the electronic device to perform a second action different from the first action, in response to the first sub-time period having elapsed since the first time point, and
  controlling the electronic device according to the timing control instruction.

2. The method according to claim 1, wherein each time period further comprises a third sub-time period, wherein:
  controlling the operation of the electronic device during each time period further comprises: controlling the electronic device to perform a third action different from the second action, in response to the second sub-time period having elapsed since the second action was performed.

3. The method according to claim 2, wherein the third action is different from the first action or the same as the first action.

4. The method according to claim 1, wherein controlling the electronic device according to the timing control instruction comprises:
  acquiring an action to be performed at a current time point by the electronic device from the timing control instruction;
  controlling the electronic device to perform the action to be performed at the current time point; and
  waiting for controlling the electronic device to perform another action in response to a sub-time period corresponding to the other action having elapsed, if the other action exists in the timing control instruction; or terminating the timing control of the electronic device, if there is no other action in the timing control instruction.

5. An apparatus for timing control of an electronic device, comprising:
  one or more processors; and
  a storage device for storing one or more programs,
  wherein the one or more processors is configured to execute the one or more programs, so as to:
  receive a timing control instruction for the electronic device from a user, the timing control instruction comprises controlling the electronic device to operate repeatedly during N continuous time periods with a same certain time duration, wherein N is a positive integer greater than or equal to 2, and each time period at least comprises a first sub-time period and a second sub-time period, wherein controlling an operation of the electronic device during each time period comprises:
    controlling the electronic device to perform a first action at a first time point which is a beginning of the time period;
    controlling the electronic device to perform a second action different from the first action, in response to the first sub-time period having elapsed since the first time point, and
  control the electronic device according to the timing control instruction.

6. The apparatus according to claim 5, wherein each time period further comprises a third sub-time period,
  wherein the one or more processors is further configured to execute the one or more programs, so as to: control the electronic device to perform a third action different from the second action, in response to the second sub-time period having elapsed since the second action was performed.

7. The apparatus according to claim 6, wherein the third action is different from the first action or the same as the first action.

8. The apparatus according to claim 5, wherein the one or more processors is further configured to execute the one or more programs, so as to:
   acquire an action to be performed at a current time point by the electronic device from the timing control instruction;
   control the electronic device to perform the action to be performed at the current time point; and
   wait for controlling the electronic device to perform another action in response to a sub-time period corresponding to the other action having elapsed, if the other action exists in the timing control instruction; or terminate the timing control of the electronic device, if there is no other action in the timing control instruction.

9. A non-volatile computer-readable medium having executable instructions stored thereon that, when being executed by a processor, cause the processor to perform operations comprising:
   receiving a timing control instruction for the electronic device from a user, the timing control instruction comprises controlling the electronic device to operate repeatedly during N continuous time periods with a same certain time duration, wherein N is a positive integer greater than or equal to 2, and each time period at least comprises a first sub-time period and a second sub-time period, wherein controlling an operation of the electronic device during each time period comprises:
      controlling the electronic device to perform a first action at a first time point which is a beginning of the time period;
      controlling the electronic device to perform a second action different from the first action, in response to the first sub-time period having elapsed since the first time point, and
   controlling the electronic device according to the timing control instruction.

10. The non-volatile computer-readable medium of claim 9, wherein the instructions, when being executed by a processor, cause the processor to perform operations comprising:
   controlling the electronic device to perform a third action different from the second action, in response to the second sub-time period having elapsed since the second action was performed.

11. The non-volatile computer-readable medium of claim 9, wherein the third action is different from the first action or the same as the first action.

12. The non-volatile computer-readable medium of claim 9, wherein the instructions, when being executed by a processor, cause the processor to perform operations comprising:
   acquiring an action to be performed at a current time point by the electronic device from the timing control instruction;
   controlling the electronic device to perform the action to be performed at the current time point; and
   waiting for controlling the electronic device to perform another action in response to a sub-time period corresponding to the other action having elapsed, if the other action exists in the timing control instruction; or terminating the timing control of the electronic device, if there is no other action in the timing control instruction.

* * * * *